United States Patent
Powers et al.

(10) Patent No.: US 11,012,442 B2
(45) Date of Patent: May 18, 2021

(54) ADDRESS RESOLUTION PROTOCOL RESPONSE HANDLING

(71) Applicant: Schweitzer Engineering Laboratories, Inc., Pullman, WA (US)

(72) Inventors: Josh Powers, Pullman, WA (US); Rhett Smith, Odessa, FL (US); Robert Meine, Boise, ID (US); Dennis Gammel, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 207 days.

(21) Appl. No.: 16/381,592

(22) Filed: Apr. 11, 2019

(65) Prior Publication Data
US 2020/0329047 A1  Oct. 15, 2020

(51) Int. Cl.
*G06F 21/00* (2013.01)
*H04L 29/06* (2006.01)
*H04L 29/12* (2006.01)

(52) U.S. Cl.
CPC ............ *H04L 63/10* (2013.01); *H04L 61/103* (2013.01); *H04L 63/0876* (2013.01); *H04L 63/20* (2013.01)

(58) Field of Classification Search
CPC ..... H04L 63/10; H04L 63/0876; H04L 63/20; H04L 61/103; H04L 61/6022; H04L 63/102
See application file for complete search history.

(56) References Cited

U.S. PATENT DOCUMENTS

| | | | |
|---|---|---|---|
| 9,047,143 B2 | 6/2015 | Pruss et al. |
| 9,094,372 B2 | 7/2015 | Zuk |
| 9,124,485 B2 | 9/2015 | Heron et al. |
| 9,137,140 B2 | 9/2015 | Tao et al. |
| 9,258,212 B2 | 2/2016 | Pfeifer et al. |
| 9,258,315 B2 | 2/2016 | Martin |
| 9,270,754 B2 | 2/2016 | Iyengar et al. |
| 9,276,827 B2 | 3/2016 | Voit et al. |
| 9,282,164 B2 | 3/2016 | Finn et al. |

(Continued)

FOREIGN PATENT DOCUMENTS

| | | |
|---|---|---|
| CN | 106301952 | 1/2017 |
| EP | 3109128 | 12/2016 |
| WO | 2016206741 | 12/2016 |

*Primary Examiner* — Kendall Dolly
(74) *Attorney, Agent, or Firm* — Jared L. Cherry

(57) ABSTRACT

The present disclosure pertains to systems and methods of handling Address Resolution Protocol (ARP) responses in a software defined network (SDN). In one embodiment, a system may comprise a controller in a control plane to generate an address store comprising information associated with a plurality of devices in communication with the SDN. The controller may also program a plurality of network devices in a data plane based on a plurality of communication flows. The network devices may forward traffic according to the plurality of communication flows received from the controller. The network device may also receive: a request from the first device for information associated with the second device, determine that the first device is authorized to communicate with the second device based on the plurality of communication flows, and generate a response to the request comprising the information associated with the second device based on the address store.

20 Claims, 4 Drawing Sheets

(56) References Cited

U.S. PATENT DOCUMENTS

| | | |
|---|---|---|
| 9,330,156 B2 | 5/2016 | Satapathy |
| 9,356,871 B2 | 5/2016 | Medved et al. |
| 9,392,050 B2 | 7/2016 | Voit et al. |
| 9,467,536 B1 | 10/2016 | Kanekar et al. |
| 9,503,363 B2 | 11/2016 | Sivabalan et al. |
| 9,596,141 B2 | 3/2017 | McDowall |
| 10,367,811 B2 * | 7/2019 | Clark ..................... H04L 67/12 |
| 2003/0208596 A1 * | 11/2003 | Carolan .............. H04L 63/0209 |
| | | 709/225 |
| 2014/0280834 A1 | 9/2014 | Medved |
| 2014/0280893 A1 | 9/2014 | Pfeifer et al. |
| 2014/0317256 A1 | 10/2014 | Jiang et al. |
| 2014/0317293 A1 | 10/2014 | Shatzkamer |
| 2014/0365634 A1 | 12/2014 | Metz et al. |
| 2015/0200910 A1 * | 7/2015 | Yamada ................ H04L 61/103 |
| | | 370/254 |
| 2016/0139939 A1 | 5/2016 | Bosch et al. |
| 2016/0142427 A1 | 5/2016 | de los Reyes et al. |
| 2016/0234234 A1 * | 8/2016 | McGrew ............ H04L 63/1425 |
| 2016/0274169 A1 | 9/2016 | Cui |
| 2016/0308905 A1 * | 10/2016 | Stiekes .................. H04L 41/20 |
| 2017/0019417 A1 | 1/2017 | McGrew et al. |
| 2017/0054626 A1 | 2/2017 | Sivabalan et al. |
| 2017/0237655 A1 * | 8/2017 | Yang .................... H04L 61/103 |
| | | 370/254 |
| 2019/0036817 A1 * | 1/2019 | Suzuki ................. H04L 45/745 |
| 2019/0089742 A1 * | 3/2019 | Hill ....................... H04L 41/22 |
| 2020/0374220 A1 * | 11/2020 | Shen ...................... H04L 45/30 |

* cited by examiner

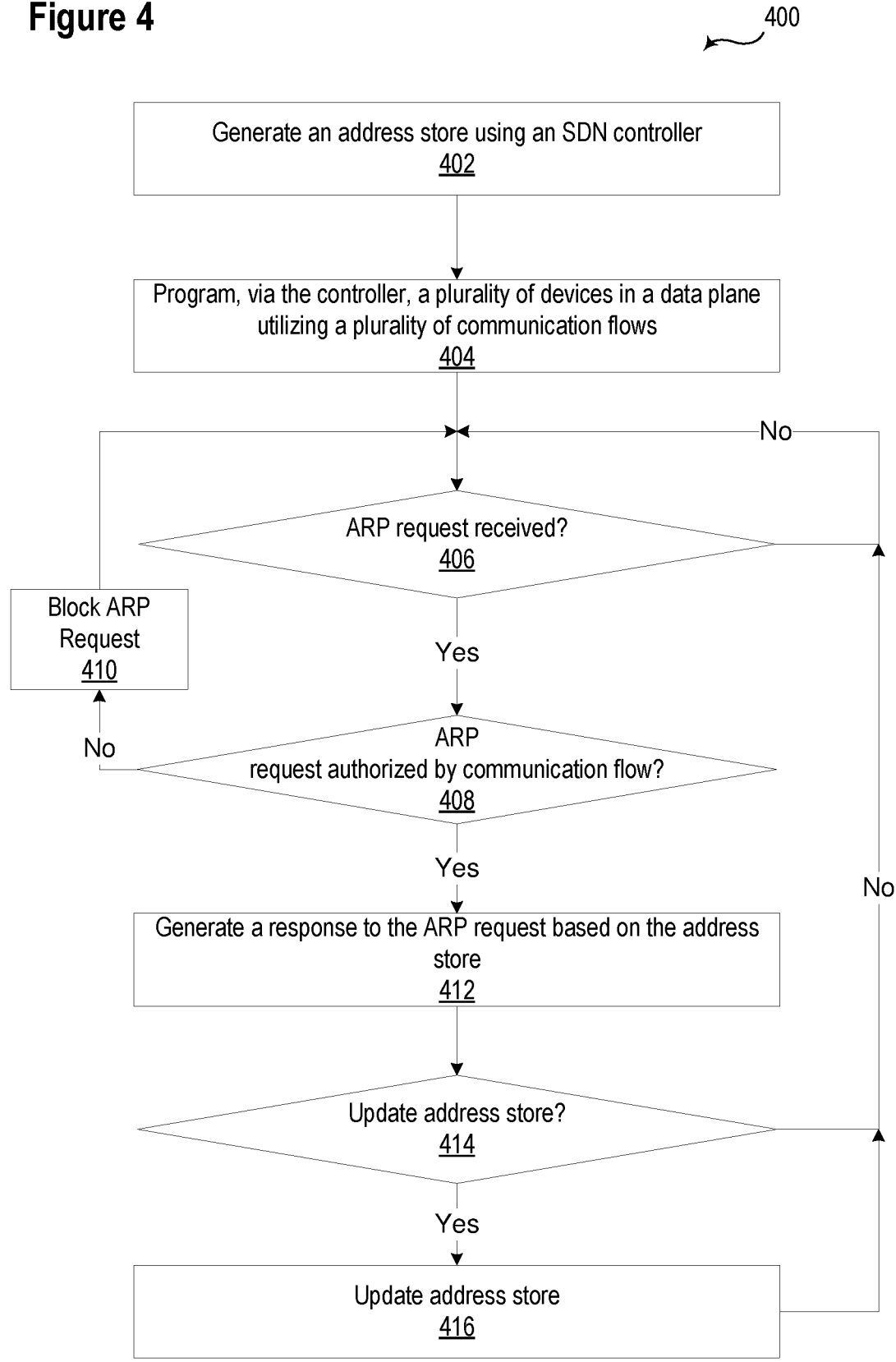

ADDRESS RESOLUTION PROTOCOL RESPONSE HANDLING

TECHNICAL FIELD

The present disclosure relates to systems and methods for handling address resolution protocol ("ARP") traffic in a software defined network ("SDN"). More particularly, but not exclusively, the techniques disclosed in the present application may be to handle ARP responses in an SDN to increase security and decrease bandwidth utilization.

BRIEF DESCRIPTION OF THE DRAWINGS

Non-limiting and non-exhaustive embodiments of the disclosure are described, including various embodiments of the disclosure, with reference to the figures, in which:

FIG. 4 illustrates a flowchart of a method for address resolution protocol response handling in an SDN consistent with the embodiments in the present disclosure.

DETAILED DESCRIPTION

Figure 1:
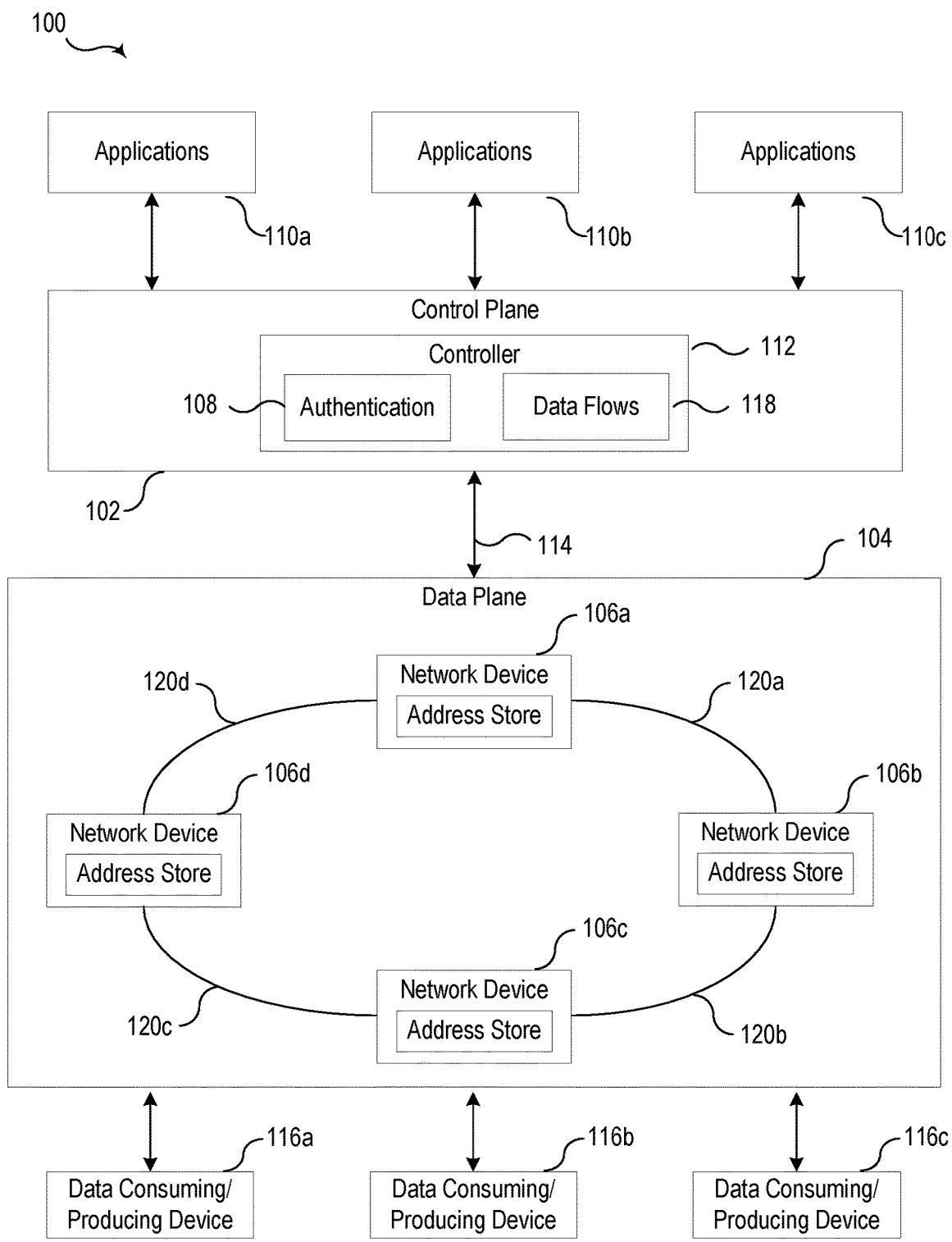
FIG. 1 illustrates a conceptual representation of a SDN including a plurality of applications, a control plane, a data plane, and a plurality of data-consuming and data-producing devices consistent with embodiments of the present disclosure.

SDN systems may be used in a variety of applications to configure and manage a network and to achieve a variety of benefits, such as deny-by-default security, deterministic transit times, latency control, symmetric transport capabilities, redundancy, fail-over planning, etc. These and other features have made SDN an attractive technology for critical infrastructure, such as electrical power systems, telephone systems, and the like. The present disclosure includes several specific examples related to electric power systems; however, one of skill in the art will recognize that the present disclosure may be adapted for use in any number of specific applications or industries.

SDN networking technologies allow programmatic changes to a network and allow an entire communication network to be managed as a single asset, which may simplify the management of the network, and enable continuous monitoring of the network. In an SDN, the control plane, which forwards the traffic, is separated from the data plane, which performs the forwarding of the traffic in the network. In contrast, in conventional networking devices, the control plane and the data plane are typically implemented in a single device (i.e., a network router or switch). A conventional networking device may generate an address table or database to process communications.

The control plane may be used to create communication flows through the network. A communication flow establishes devices that are authorized to communicate to one another. A communication flow, as the term is used herein, refers to a set of parameters used to match and take action based on network packet contents. Communication flows enable communication between devices based on a variety of criteria and offer significant control and precision to operators of the network. In contrast, in large traditional networks, trying to match a network-discovered path with a desired data path may be a challenging task involving changing configurations in many devices. To compound this problem, the management interfaces and feature sets used on many devices are not standardized. Still, further, network administrators often need to reconfigure the network to avoid loops, gain route convergence speed, and prioritize a certain class of applications.

Significant complexity in managing a traditional network, for example in the context of an electric power transmission and distribution system, arises from the fact that each network device (e.g., a switch or router) has control logic and data-forwarding logic integrated together. For example, in traditional network appliances, dynamic control plane protocols such as Routing Information Protocol, Open Shortest Path First, Spanning Tree Protocol, Address Resolution Protocol, and the other dynamic control plane protocols may be used to determine how a packet should be forwarded. The paths determined by the routing protocol are encoded in address tables, which are then used to forward packets. Similarly, in a Layer 2 device such as a network bridge (or network switch), configuration parameters and/or Spanning Tree Algorithm constitute the control logic that determines the path of the packets. Thus, the control plane in a traditional network is distributed in the switching fabric of the network.

In an SDN, a controller embodies the control plane and determines how packets (or frames) should flow (or be forwarded) in the data plane of the network. The controller communicates this information to the network devices, which constitute the data plane, by setting their forwarding tables. This enables centralized configuration and management of a network. As such, the data plane in an SDN may consist of relatively simple packet-forwarding devices with a communications interface to the controller to receive forwarding decisions. In addition to simplifying management of a network, an SDN architecture may also enable monitoring and troubleshooting features that may be beneficial in critical infrastructure, including but not limited to: mirroring a data-selected flow rather than mirroring a port; alarming on bandwidth near saturation; providing metrics (e.g., counters and meters for quality of service, packet counts, errors, drops, or overruns, etc.) for a specified flow, permitting monitoring of specified applications rather than monitoring based on virtual local area networks or MAC addresses, and/or monitoring destinations of ARP requests.

An SDN may operate on and control packet sequences by a variety of techniques, including meter entries, flow entries, and group entries. Flow entries define how a switch in the data plane is to handle packets. The flow entry operates on a packet when there is a match between some criteria of the packet and the flow entry's match fields. Group entries may be utilized to enhance forwarding behavior of the communication flows and to apply Quality of Service policies to the packet. In various embodiments consistent with the present disclosure, the OpenFlow protocol may be utilized to control communication devices in a data plane of an SDN.

The present disclosure enhances the ability of an SDN device to prevent ARP spoofing and decreases the amount of network bandwidth utilized by ARP requests. Using the systems and methods disclosed herein, an SDN network may allow a switch to either respond on behalf of a device associated with the switch or may block an ARP request. For example, a first device may generate an ARP request for the IP address of the second device. A network device, such as a network switch, may receive the device and determine whether the first device is authorized to communicate with the second device based on the communication flow. If the network device determines that there is not a communication flow authorizing the first device to communicate with the second device, the network device may simply block the ARP request. If the network device determines that there is a communication authorizing the first device to communicate with the second device, the network device may generate an ARP response with the IP address of the second device. By utilizing the switch to respond on behalf of the network device, the ability for ARP spoofing is decreased. Further network utilization is decreased because the ARP request is resolved by a single network device rather than broadcasting the ARP request on the network.

Embodiments consistent with the present disclosure may be utilized in a variety of communication devices. A communication device, as the term is used herein, is any device that is capable of accepting and forwarding data traffic in a data communication network. Communication devices may include switches, routers, bridges, firewalls, gateways, etc. In addition to the functionality of accepting and forwarding data traffic, communication devices may also perform a wide variety of other functions and may range from simple to complex devices.

The embodiments of this disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product, including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a conceptual representation of an SDN 100 including a plurality of applications 110a-110c, a control plane 102, a data plane 104, and a plurality of data-consuming and data-producing devices 116a-116c that may be deployed in a system consistent with embodiments of the present disclosure. The control plane 102 directs the flow of data through the data plane 104. More specifically, a controller 112 located on the control plane 102 may communicate with a plurality of network devices 106a-106d via an interface 114 to establish communication flows. The controller 112 may specify rules for routing traffic through the data plane 104 based on a variety of criteria.

Communication flows establish which devices 116a-116c may communicate with each other. For example, a communication flow may enable communication between devices 116a and 116b. Accordingly, traffic between devices 116a and 116b may be permitted so long as such communications satisfy the requirements of the communication flow. To the extent that the communications do not satisfy the requirements of the communication, the traffic may be blocked by devices in the data plane.

In various embodiments, an address store may be generated that includes, among other things, the information necessary to respond to ARP requests, such as MAC addresses and IP addresses for each device in system 100. In some embodiments, the controller 112 may generate the address store. The controller 112 may transmit the address store, or a relevant portion of the address store, to each network device 106a-106d in the data plane 104. In other embodiments, each network device 106a-106d may generate an address store based on communication flows implemented by the device. The address store may be specific to an associated network device 106a-106d, or a common address store may be used by each network device 106a-106d.

The communication flows and address store(s) may be used to respond to ARP requests. For example, a communication flow may enable communication between device 116a and device 116b and both devices may be in communication with network device 106c. Accordingly, an ARP request from device 116a for the IP address of device 116b should result in an ARP response. In one embodiment, network device 106c may generate an ARP response based on its address store. In another embodiment, the ARP request may be forwarded directly to device 116b, which would generate a response. In both embodiments, the need to broadcast the ARP request to other devices in data plane 104 is eliminated, along with risk of ARP spoofing.

According to a deny-by-default security policy, a lack of a communication flow enabling communication between two devices prevents communications between these devices. For example, a lack of a communication flow permitting communication between devices 116a and 116c may result in an ARP request from device 116a for the IP address of device 116c being blocked (along with all other traffic) by a network device. The ARP request from device 116a may be blocked without broadcasting the ARP request on the network.

In various embodiments, packet attributes, network topology, and/or user settings may determine which device handles a specific ARP. For example, where a communication flow allows for communication between devices, an ARP request may be delivered only to the intended device. For example, an ARP request sent from device 116a and seeking information about device 116c may be forwarded by the data plane 104 to device 116c. Alternatively, a network device 106a-106d in communication with either device 116a and/or device 116c may respond to the ARP request. In some instances, specific types of communication (e.g., communication using specified protocols) may be used as criteria in a communication flow. Such configurations may allow for ARP requests to be processed from devices that communicate according to a protocol specified by a communication flow.

The data plane 104 of system 100 includes a plurality of network devices 106a-106d. The network devices 106a-106d are arranged in a ring topology, although a variety of topologies may also be utilized in other embodiments. The network devices 106a-106d may be embodied as switches, multiplexers, and other types of communication devices. The controller 112 may communicate with program network devices 106a-106d to allow communication among end devices. End devices, such as data consuming/producing devices 116a-116c, may include various types of devices that enable machine-to-machine communication, human-to-machine communication, or human-to-human communication through data plane 104. The controller 112 may utilize communication flows to determine if the end devices and/or network devices in system 100 may communicate.

In instances when the controller 112 determines that communication between end devices is permitted, the controller 112 may provide an address store that may be used to enable communication, by, among other things, responding to ARP requests. The address store may include a MAC address and a corresponding IP address associated with the network device 106a-106d. For example, the controller 112 may update the address store with a MAC address and IP address associated with a device when the network device 106a-106d joins the network. In some embodiments, when the MAC address or IP address is updated in the address store, the controller 112 updates the end device by providing the updated information. Updating the end device with the updated subset of the network device 106a-106d allows the end device to utilize this updated data rather than utilizing the outdated subset that may no longer be valid. Utilizing outdated data may increase bandwidth usage and increase the amount of failed communications.

When a new network device joins the network, the controller 112 may receive an initial synchronization ("SYN") packet containing the MAC address associated with the new network device. The controller 112 may further update the address store in response to the new network device and provide an updated subset to the address store. The controller 112 may further update the communication flows associated with the new network device. In some embodiments, the IP address associated with the new network device may be a static IP address. In some embodiments, one or more devices on the network may include a static IP address. The controller 112 may update the address store with the IP address associated with each network device 106a-106d.

In various embodiments, the address store may be stored in its entirety on various devices 106a-106d through the data plane 104, while in other embodiments, only a subset of the address store may be stored by a given device. Various factors may be considered to determine whether a particular system provides a complete address store to components in the data plane 104 or provides a subset of the address store to such components.

The data consuming/producing devices 116a-116c may represent a variety of devices within a system that produce or consume data. For example, data consuming/producing devices 116a-116c may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be forwarded through the data plane 104 using a plurality of communication flows implemented by controller 112. Of course, data consuming/producing devices 116a-116c may be embodied by a wide range of devices consistent with embodiments of the present disclosure.

In embodiments utilized in connection with electric power systems, data consuming/producing devices 116a-116c may be embodied as intelligent electronic devices (IEDs). As used herein, an IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

Figure 2:
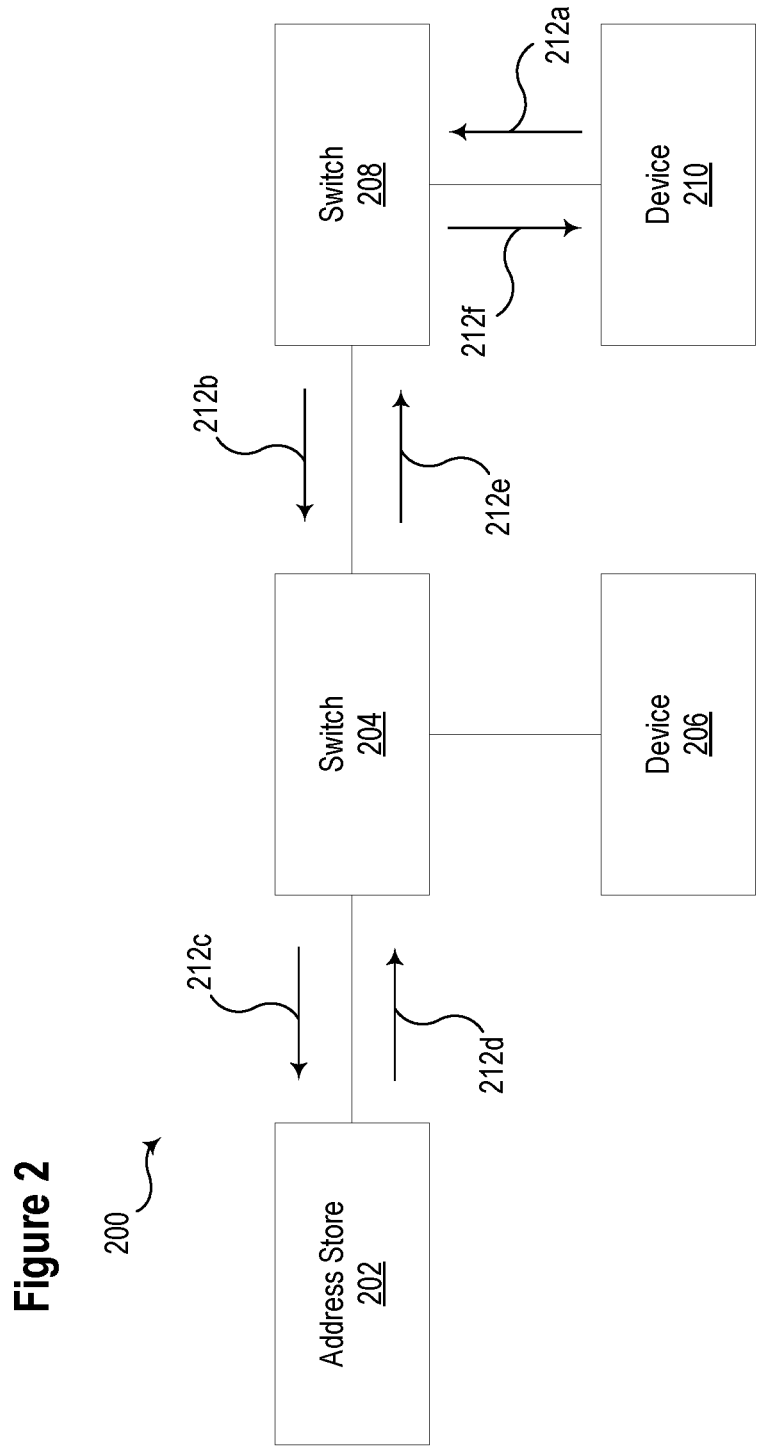
FIG. 2 illustrates a conceptual representation of a system including an address store, a plurality of switches, and a plurality of devices consistent with embodiments of the present disclosure.

FIG. 2 illustrates a block diagram of a system 200 including an address store 202, a plurality of switches 204, 208, and a plurality of devices 206, 210 consistent with embodiments of the present disclosure. Devices 206, 210 may be embodied as any device that produces and/or consumes data. In various embodiments, devices 206, 210 may comprise IEDs used within an electric power system.

In the illustrated example, device 206 is in communication with switch 204 and device 210 is in communication with switch 208. A communication link between the switches 204, 208 may be utilized to communicate data between device 206 and 210. Such communication may be enabled by a communication flow. As part of such communication, device 206 may periodically send ARP requests received by the switch 204 to obtain information about device 210.

An address store 202 may be used by switch 204 and/or switch 208 to respond to ARP requests. In various embodiments, a SDN controller (not shown) may generate and maintain address store 202. The controller may update the address store 202 with the MAC addresses and IP addresses of each device in the network. For example, the controller may update the address store 202 if a new device joins the network or a new IP address is assigned to a device. Updating the subsets prevents the end device from utilizing outdated and/or incorrect data.

Although illustrated separately in FIG. 2, address store 202 may be incorporated, either in whole or in part, in switch 204 and/or switch 208. When switch 204 or 208 receives an ARP request, switch 204, 208 may utilize the address store 202 to generate a response.

In one example, device 210 may send an ARP request 212*a* for information related to device 206. Switch 208 may receive the ARP request 212*a* and may determine if device 210 is authorized to communicate with device 206 based on communication flows in system 200. If device 210 is authorized to communicate with device 206, switch 208 may respond to the ARP request. More specifically, switch 208 may make a request 212*b* to switch 204 for information responsive to the ARP request. Switch 204 may make a request 212*c* to the address store 202. Information responsive to the request 212*d* may be provided by the address store to switch 204. Switch 204 may forward the information 212*e* to switch 208, which may send a response 212*f* to the ARP request to device 210.

In the description provided above relating to the flow of information from 212*a* to 212*f*, it will be appreciated that in other embodiments, the ARP request from device 210 may pass from switch 208 to switch 204, and then to the address store 202. The address store 202 may generate an ARP response that passes from the address store 202 to switch 204, to switch 208, and then to device 210. Forwarding of information and or ARP requests and responses may be handled using a variety of techniques consistent with the present disclosure.

Various embodiments consistent with the present disclosure may handle ARP requests and responses in the data plane to avoid the possibility for ARP spoofing. Keeping the ARP request within the data plane of the network, or even limited to a single switch prevents other devices from responding to ARP requests and spoofing a device being queried.

Figure 3:
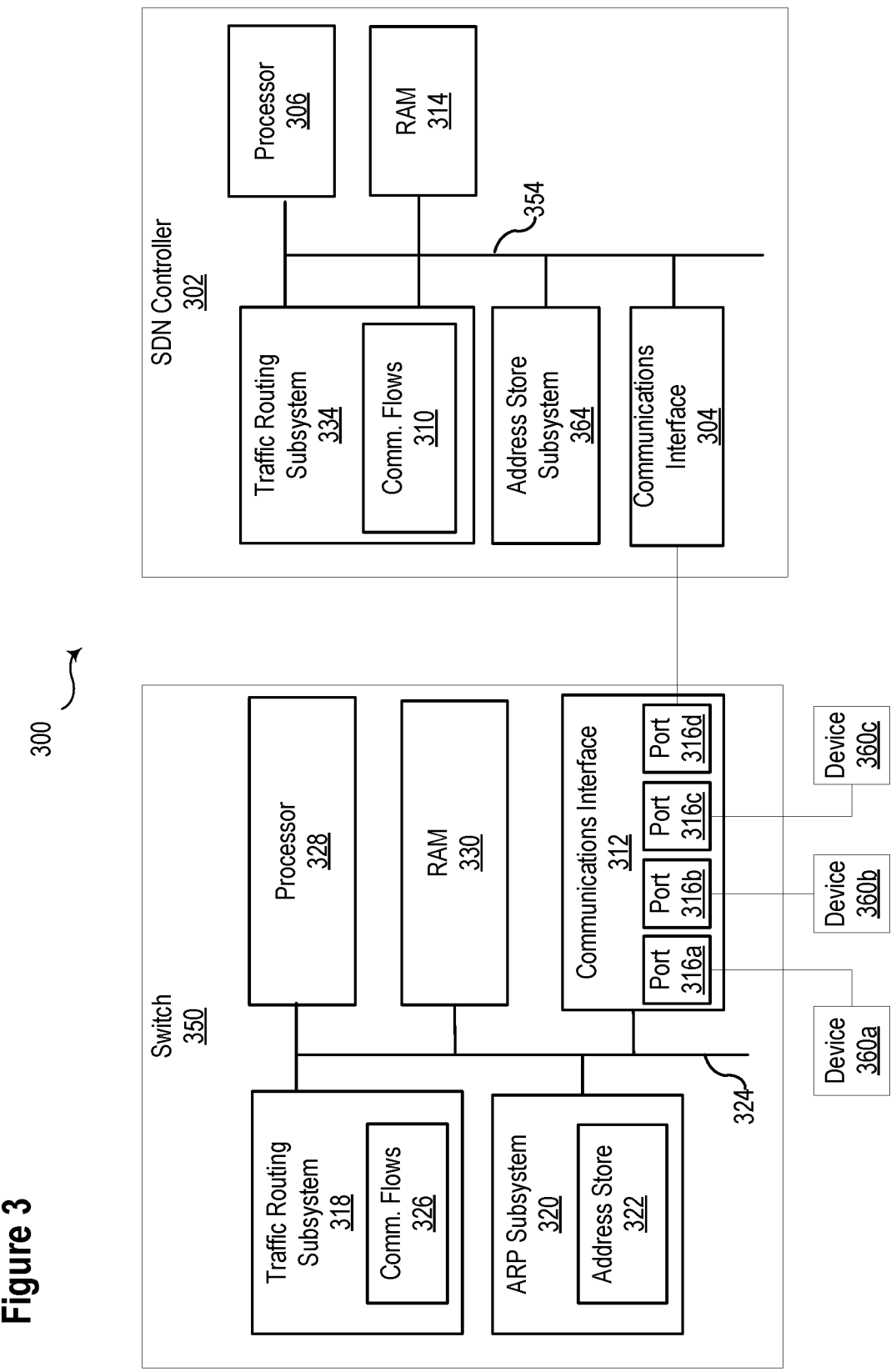
FIG. 3 illustrates a functional block diagram of an SDN including a controller, a switch, and a plurality of devices consistent with embodiments of the present disclosure.

FIG. 3 illustrates a block diagram of a system 300 including an SDN controller 302, a switch 350, and a plurality of devices 360*a*-360*c* consistent with embodiments of the present disclosure. In some embodiments, system 300 may be implemented using hardware, software, firmware, and/or any combination thereof. Moreover, certain components or functions described herein may be associated with other devices or performed by other devices. The specifically illustrated example is merely representative of one embodiment consistent with the present disclosure.

SDN controller 302 includes a processor 306 that processes information and coordinates the operation of the other components of SDN Controller 302. A data bus 354 may facilitate communication among various components of SDN controller 302. Instructions to be executed by processor 306 may be stored in random access memory (RAM) 314. Processor 306 may operate using any number of processing rates and architectures. Processor 306 may be used to perform any of the various algorithms and calculations described herein. Processor 306 may be embodied as a general-purpose integrated circuit, an application-specific integrated circuit, a field-programmable gate array, and/or any other suitable programmable logic device. Such instructions may include information for processing and routing and data packets received via communications interface 304.

A traffic routing subsystem 334 may be used to generate and implement a variety of communication flows 310. Communication flows 310 may specify which devices 360*a*-360*c* are authorized to communicate. Further, communication flows 310 may specify a route through a variety of intermediate devices (e.g., routers, switches, multiplexers, etc.), although only a single switch is illustrated in FIG. 3. Where system 300 is configured to implement a deny-by-default scheme, communications are blocked that are not specifically authorized by communication flows 310.

Communication flows 310 may also be utilized to determine whether to respond to ARP requests. For example, where a communication flow 310 may authorize communication between device 360*a* and device 360*b*, the same communication flow may also authorize device 360*a* to send an ARP request directed to device 360*b*. On the other hand, if device 360*a* sends an ARP request directed toward device 360*c* and no communication flow 310 authorizes communication between device 360*a* and device 360*c*, the ARP request may be blocked.

A communications interface 304 may enable communication between SDN controller 302 and other devices in system 300. In various embodiments, the communication interface 304 may be configured to communicate via a variety of communication links, including Ethernet, fiber optic, and other forms of data communication channels. Communications interface 304 may allow communication with switch 350 and may allow SDN controller 302 to program switch 350 to implement communication flows 310. Although not illustrated in FIG. 3, SDN controller 302 may be in communication with a plurality of other devices, such as additional switches, routers, firewalls, devices, and other systems.

An address store subsystem 364 may generate and update an address store of devices in system 300. In various embodiments, the address store 364 comprises information used to respond to ARP requests, and includes MAC addresses and corresponding IP addresses. When a new device is added to system 300 or an IP address changes, address store subsystem 364 may update the address store with relevant information. Updated information may be transmitted to other devices in system 300 via communications interface 304.

In some embodiments, address store subsystem 364 may generate one or more subsets of the address store for use by different devices. Such subsets may be generated based on authorized communication flows within system 300. For example, if communication flows 310 establish that traffic from a specific device will not pass through switch 350, information about that specific device may be omitted from the subset of the address store provided to switch 350.

Switch 350 includes a processor 328 that processes information and coordinates the operation of the other components of switch 350. A data bus 324 may facilitate communication among various components of switch 350. Instructions to be executed by processor 328 may be stored in RAM 330. Processor 328 may operate using any number of processing rates and architectures. Processor 328 may be used to perform any of the various algorithms and calculations described herein. Processor 328 may be embodied as a general-purpose integrated circuit, an application-specific integrated circuit, a field-programmable gate array, and/or any other suitable programmable logic device. Such instructions may include information for processing routing and data packets received via communications interface 312.

Communications interface 312 comprises a plurality of ports 316a-316d, each of which is in communication with a different device. Port 316d is in communication with SDN controller 302 and may represent a connection to a control plane of an SDN network. Ports 316a-316c are in communication with devices 360a-360c, respectively. Devices 360a-360c may represent a variety of types of equipment that produce or consume data transmitted by system 300. For example, devices 360a-360c may comprise IEDs used in an electric power system.

A traffic routing subsystem 318 may implement a plurality of communication flows 326. Communication flows 326 may be received from SDN controller 302 and may identify communications authorized to pass through switch 350. Communications that are not authorized by communication flows 326 may be blocked by switch 350. Traffic routing subsystem 318 may control the flow of data between devices connected to ports 316a-316d.

An ARP subsystem 320 may handle ARP requests and responses received by switch 350. ARP subsystem 320 may operate in conjunction with traffic routing subsystem 318 to determine whether a device that generated an ARP request is authorized to communicate with the device sought by the ARP request. For example, if device 360a issues an ARP request for information about device 360b, ARP subsystem 320 may determine whether a communication flow 326 authorizes communication between device 360a and device 360b. If a communication flow 326 authorizes communication between device 360a and device 360b, switch 350 may generate a response to the request. If no communication flow 326 authorizes communication between device 360a and device 360b, switch 350 may block the ARP request.

Systems and methods consistent with the present disclosure may respond to valid ARP requests without broadcasting ARP requests to multiple devices. Such systems and methods may reduce or eliminate the potential for ARP spoofing and decrease bandwidth utilization. In some embodiments, ARP subsystem 320 may respond to ARP requests using information comprised in an address store 322. In the illustrated embodiment, for example, address store 322 may comprise an association of the MAC addresses and IP address of each device in communication with switch 350 (i.e., devices 360a-360c and SDN controller 302). In other embodiments, switch 350 may forward ARP requests to another device (e.g., SDN controller 302) to determine whether to generate a response, and if so, the information to provide in the response. In still other embodiments, switch 350 may forward valid ARP requests to a target device and the device may generate a response.

FIG. 4 illustrates a flowchart of a method 400 for responding to an ARP request in an SDN consistent with the embodiments in the present disclosure. At 402, an SDN controller generates an address store. The address store may include information used to respond to ARP requests, such as MAC addresses and IP address of devices in a SDN.

At 404, the controller programs a plurality of devices in a SDN data plane utilizing a plurality of communication flows. Communication flows determine devices that are authorized to communicate, and thus avoid the deny-by-default security policy typically implemented in a SDN. Communication flows may be used to forward traffic based on a variety of criteria, such as originating device, destination device, network port, etc.

Method 400 waits to receive an ARP request at 406. Upon receipt of an ARP request, method 400 may determine at 408 whether the ARP request is authorized or permitted. The plurality of communication flows may be utilized to determine whether a device making the ARP request is authorized to communicate with the device that is the subject of the request. In some embodiments, if a communication flow authorizes communication between a device making an ARP request and the device that is the subject of the ARP request, the ARP request is deemed authorized. In other embodiments, specific communication flows may authorize ARP requests between devices. If the ARP request is not authorized, the ARP request may be blocked at 410.

At 412, an ARP request may be generated based on the address store. In various embodiments, the response may be generated by one of several different devices. For example, in some embodiments, a switch in communication with the requesting device may generate the response. In such embodiments, the ARP request may not be transmitted beyond the switch. In other embodiments, the ARP request may be forwarded to a central device (e.g., the SDN controller), and the central device may generate the response. In still other embodiments, the ARP request may be forwarded to the target device, and the target device may respond to the request.

At 414, method 400 may determine if an update to the address store is needed. Updates may comprise changes to IP addresses, new devices that joined the network, devices that left the network, etc. Upon the occurrence of changes, the address store may be updated at 416. Updates may be distributed to devices that contain the address store either in whole or in part.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to respond to requests for information in a software defined network ("SDN"), the system comprising:
   a controller in a control plane to:
      generate an address store comprising information associated with a plurality of devices in communication with the SDN; and
      program a plurality of network communication devices in a data plane based on a plurality of communication flows; and
   a network communication device in the data plane and in communication with the controller to:
      receive at least a portion of the plurality of communication flows from the controller;
      forward traffic according to the plurality of communication flows received from the controller; and
      the network communication device comprising:
         a first communication port in communication with a first device; and
         a second communication port in communication with a second device;
         wherein the network communication device:
            receives a first request from the first device for information associated with the second device;

determines that the first device is authorized to communicate with the second device based on the at least a portion of the plurality of communication flows; and generates a response to the first request comprising the information associated with the second device based on the address store.

2. The system of claim 1, wherein the request comprises an address resolution protocol ("ARP") request.

3. The system of claim 2, wherein the address store comprises an association between a media access control ("MAC") address and an internet protocol ("IP") address for each of the plurality of devices in communication with the SDN.

4. The system of claim 2, wherein the network communication device applies a deny-by-default security policy to ARP requests.

5. The system of claim 4, wherein a switch generates exceptions to the deny-by-default security policy based on the plurality of communication flows.

6. The system of claim 1, wherein the network communication device further:
receives a second request from a third device for information associated with the second device;
determines that the third device is not authorized to communicate with the second device based on the subset of the plurality of communication flows; and
blocks the second request.

7. The system of claim 1, wherein the network communication device further:
queries the address store in response to the first request;
receives the information associated with the second device in response to the query.

8. The system of claim 1, wherein the network communication device further:
receives the address store from the controller; and
generates the response based on the address store received from the controller.

9. The system of claim 1, wherein the network communication device comprises a switch.

10. The system of claim 1, wherein the controller updates the address store in response to one of a new device joining the SDN and a change to information associated with a device in the SDN.

11. A method to respond to requests for information in a software defined network ("SDN"), the method comprising:
a controller in a control plane:
generating an address store comprising information associated with a corresponding plurality of devices in communication with the SDN;
programming a plurality of network communication devices in a data plane based on a plurality of communication flows; and
a network communication device in a data plane:
receiving at least a portion of the plurality of communication flows from the controller;
forwarding traffic according to the plurality of communication flows received from the controller;
receiving a first request from a first device for information associated with a second device;
determining that the first device is authorized to communicate with the second device based on the at least a portion of the plurality of communication flows; and
generating a response to the first request comprising the information associated with the second device based on the address store.

12. The method of claim 11, wherein the first request comprises an address resolution protocol ("ARP") request.

13. The method of claim 12, wherein the address store comprises an association between a media access control ("MAC") address and an internet protocol ("IP") address for each of the plurality of devices in communication with the SDN.

14. The method of claim 12, wherein the network communication device applies a deny-by-default security policy to ARP requests.

15. The method of claim 14, wherein a switch generates exceptions to the deny-by-default security policy based on the plurality of communication flows.

16. The method of claim 11, further comprising the network communication device:
receiving a second request from a third device for information associated with the second device;
determining that the third device is not authorized to communicate with the second device based on the subset of the plurality of communication flows; and
blocking the second request.

17. The method of claim 11, further comprising the network communication device:
querying the address store in response to the first request;
receiving the information associated with the second device in response to the query.

18. The method of claim 11, further comprising the network communication device:
receiving the address store from the controller; and
generating the response based on the address store received from the controller.

19. The method of claim 11, further comprising the controller updating the address store in response to one of a new device joining the SDN and a change to information associated with a device in the SDN.

20. A software defined network (SDN) switch, comprising:
a control plane interface in communication with an SDN controller in a control plane;
a first physical communication port in communication with a first device; and
a second physical communication port in communication with a second device;
wherein the SDN switch:
receives from the controller via the control plane interface a plurality of communication flows;
receives from the controller via the control plane interface an address store comprising information associated with the first device and the second device;
forwards traffic between the first device and the second device according to the plurality of communication flows;
receives an address resolution protocol (ARP) request from the first device for information associated with the second device;
determines that the first device is authorized to communicate with the second device based on the plurality of communication flows; and
generates a response to the ARP request comprising the information associated with the second device based on the address store.

* * * * *